Feb. 14, 1950
S. W. SEELEY
2,497,840
ANGLE MODULATION DETECTOR
Filed June 14, 1945
2 Sheets-Sheet 1
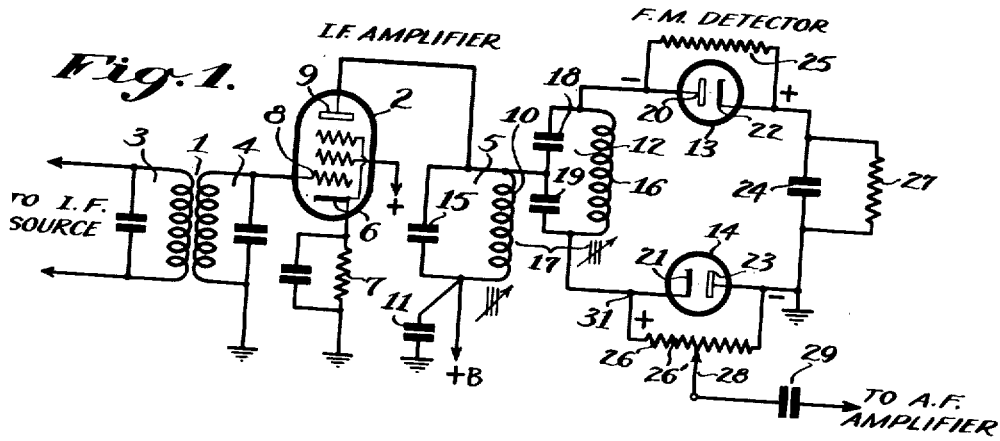
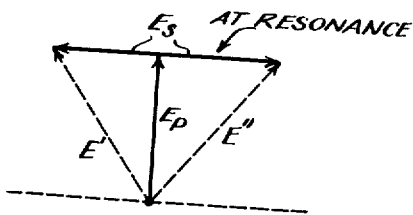
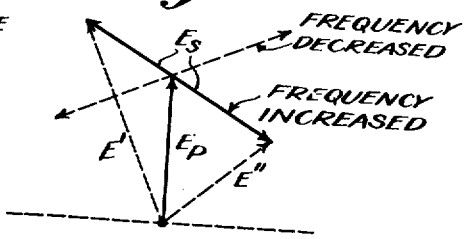
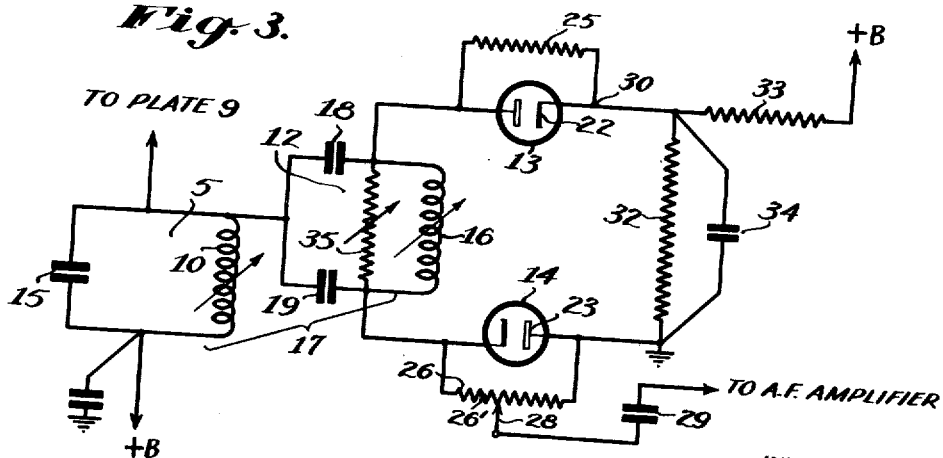
INVENTOR
STUART W. SEELEY
BY
ATTORNEY

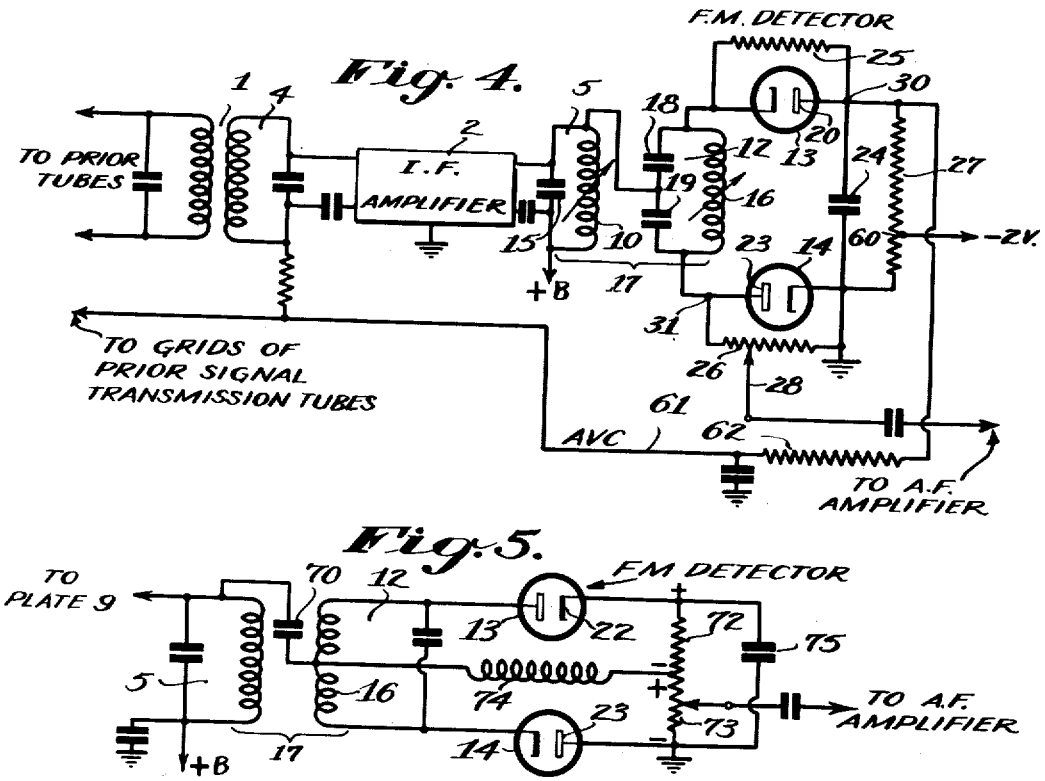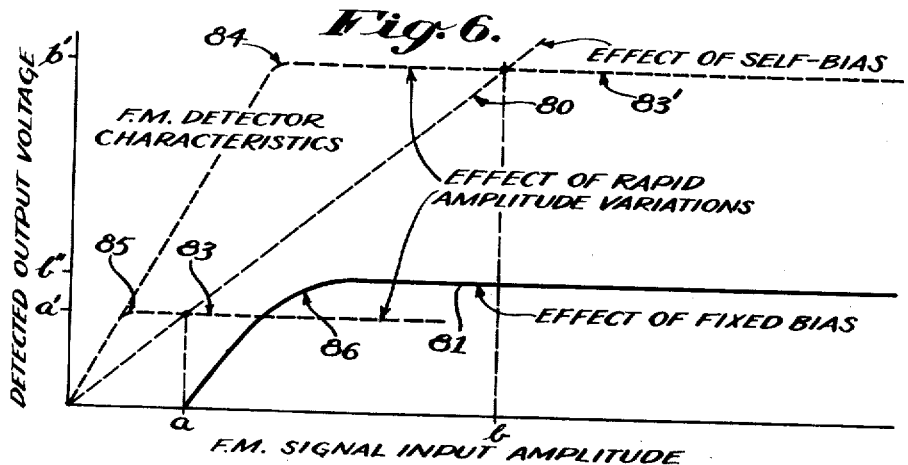

Patented Feb. 14, 1950

2,497,840

UNITED STATES PATENT OFFICE 2,497,840

ANGLE MODULATION DETECTOR

Stuart W. Seeley, Roslyn Heights, N. Y., assignor to Radio Corporation of America, a corporation of Delaware Application June 14, 1945, Serial No. 599,343

34 Claims. (Cl. 250—27)

My present invention relates generally to detectors of angle modulated carrier waves insensitive to amplitude variations, and more particularly to a novel method of, and means for, deriving the modulation from a frequency modulated (FM), or phase modulated (PM), carrier wave without allowing co-existent amplitude modulation (AM) variations to result in substantial detector output potentials.

In the past there have been provided various methods of detecting angle modulated carrier waves without response to undesired amplitude variations. By "angle modulation" is meant either FM, PM or hybrid forms of modulation possessing characteristics common to both of them. In the generation, transmission and reception of angle modulated waves such undesired AM effects may come from the transmitter directly, may be due to interfering impulses, or may be caused by lack of uniform gain over the signal selector pass band. In prior detection systems which were inherently immune to such undesired AM effects the means employed was either relatively uneconomical as compared to the cost of a special amplitude limiter stage prior to the detector, or the degree of immunity to undesired AM effects was insufficient.

It is, therefore, an important object of my present invention to provide a simplified detector of angle modulated waves which has a high degree of immunity to undesired AM effects of received waves, the detector including a minimum of special components over and above those required for known forms of detectors, and which improves the operation of FM receivers.

It is well known that most balanced FM discriminators are balanced against amplitude variations at the center frequency of their characteristic. However, if the mean frequency of the received FM signals shifts relative to center frequency, spurious AM effects may cause either distortion, interference or both. It is another important object of my present invention to provide an FM, or other angle modulation, detector which is balanced against such AM interference or distortion regardless of whether the received carrier (or even the AM component of the waves) is centered on the detector characteristic. Another important advantage of a balanced FM detector circuit constructed in accordance with my invention is that "interstation" noise effects may be considerably reduced.

A further object of my invention is to provide a demodulator for frequency or other angle-modulated waves including a pair of rectifiers, means for combining the rectified current potentials of the rectifiers in series-aiding polarity, and means for connecting the rectifiers in parallel for derivation of modulation frequency waves and for substantially maintaining the sum of the rectified potentials against modulation frequency variations for rejection of undesired amplitude variations of the modulated waves impressed on the rectifiers.

In accordance with a still further object of my invention, I provide a frequency modulation detector comprising a pair of rectifiers each having at least an anode and a cathode, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents, in combination with means for applying frequency modulated carrier waves to the respective rectifiers, and means, which may conveniently be resistance and a large capacity connected in parallel with each other, in one of the circuits for establishing a direct current potential substantially fixed against modulation frequency variations, and connections for deriving modulation frequency voltage variations from one of the circuits in relation to the other.

In accordance with a still further object, my invention contemplates in the detection of angle-modulated waves the method which includes impressing respectively upon a pair of rectifiers a pair of signal potentials whose relative magnitudes are a function of the angle modulation of the received waves, adding the respective rectified direct current potentials in series-aiding relation, maintaining the total of the added potentials against modulation frequency variations, variably damping the input to the rectifiers as a function of the instantaneous amplitude of the signal impressed on the rectifiers, and deriving modulation frequency variations from the rectifier circuits.

Application of my invention to a known form of balanced FM detector of the general type disclosed and claimed in my U. S. Patent No. 2,121,103, granted June 21, 1938, involves reversal of one of the diode rectifiers. Such reversal results in the rectified direct current voltages across the diode load resistors, now in series, becoming additive, instead of providing zero direct current voltage at the output point in response to the FM carrier frequency being accurately centered. The additive voltage is either positive or negative depending on which end of the series-connected load resistors is grounded. The ungrounded end of the series-related load resistors is then established at a relatively fixed potential for modulation signal frequencies whereby substantially no modulation voltage can exist between the opposite ends of the load resistors. In effect, then, the load resistors are in parallel to ground for modulation voltage, but in series for direct current voltage. The tap between the two load resistors, or a variable tap on either one, may then serve as the modulation voltage output point.

In a further important embodiment of my invention, the direct current voltage across the series-connected load resistors is fixed in a predetermined manner, so that the direct current voltage cannot vary substantially at a modulation rate. There is thereby established a threshold value below which no detection of any kind can occur.

It is a further object of one embodiment of my present invention to provide an FM detector circuit having the aforesaid functions, and, in addition, a de-emphasis effect due to a suitable time constant network provided by the discriminator condensers and the load resistors.

More specific objects of my invention will appear in the following detailed description of various embodiments of the basic features, it being pointed out that my balanced FM detector system, substantially immune to AM effects, has important applicability to low-cost FM receiver construction.

The novel features which I believe to be characteristic of my invention are set forth with particularity in the appended claims; the invention itself, however, as to both its organization and method of operation will best be understood by reference to the following description, taken in connection with the drawing, in which I have indicated diagrammatically several circuit organizations whereby my invention may be carried into effect.

In the drawings:

Fig. 1 is a schematic circuit diagram of one embodiment of the invention;

Figs. 2a and 2b respectively show different vector relations between the primary and secondary voltages of the discriminator;

Fig. 3 shows a modification of Fig. 1, wherein fixed bias is employed on the diodes;

Fig. 4 illustrates a circuit arrangement for securing delayed automatic volume control (AVC) action from the present detector circuit;

Fig. 5 shows a further modification of the detector circuit; and

Fig. 6 portrays illustrative and explanatory "FM signal input amplitude vs. detected output voltage" characteristics of the present invention.

Referring now to the accompanying drawings, wherein like reference characters in the several figures designate similar circuit elements, there is shown in Fig. 1 the detector network of an FM receiver of the superheterodyne type. While my invention is readily incorporated in any form of receiver of FM waves, I prefer to explain the functioning of my invention in connection with a superheterodyne receiver system since such a system is widely used at present. As previously explained the present invention is not restricted to reception of FM waves, since phase modulated carrier waves could be received as well. An FM wave is produced at the FM transmitter by deviating the carrier wave relative to its mean frequency to an extent proportional to the amplitude of the modulating voltage and independent of the modulating frequency. A PM wave differs in having a frequency deviation which increases with modulating frequency. The generic expression "angle modulation" is, also, intended to include a modulated wave of preferably constant amplitude wherein the modulation is neither pure FM nor pure PM, but contains components resembling one or both of them, and is, therefore, a hybrid modulation.

In the present application it is assumed, by way of specific example, that the receiver is designed to operate in the FM broadcast band of 42-50 megacycles (mc.), and that each transmitter radiates an FM wave having a maximum frequency deviation up to ±75 kilocycles (kc.) with respect to the normal transmitter frequency. These are the assigned frequency values of the present day FM broadcast band; and are used here merely by way of illustration. The receiver may include any desired form of signal collector, as, for example, a dipole. The collected FM signal waves may be applied to a suitable converter for reduction of the mean frequency value without change of the deviation. The converter may be of any desired construction, and is preferably preceded by one or more stages of selective high frequency amplification. Suitable signal selector circuits, usually employing a variable condenser or adjustable inductor, are employed for adjustment to receive a desired FM station. The signal selector circuits will, of course, preferably be adjusted accurately to resonate the various adjustable selector circuits to the center or mean frequency of the desired FM station.

In a superheterodyne receiver the converter is fed with oscillations from an oscillator whose tank circuit includes an adjustable reactance device, usually a variable condenser or adjustable inductor. The latter is customarily adjusted concurrently with the aforesaid selector devices so that the tank circuit will be tuned to a local oscillation frequency differing from the desired carrier frequency by the operating intermediate frequency (I. F.). The selective circuits of, and preceding, the converter may on the other hand be of the fixedly tuned type, if desired. The intermediate frequency is usually chosen from a range of 2 to 15 mc., by way of example, 5 mc. Any suitable actuating mechanism may be used for operating the station selecting devices. The converter may use the well-known pentagrid tube, or it may use separate oscillator and mixer tubes. These various circuits and circuit components are very well known to those skilled in the art of radio communication, and need only be briefly referred to.

The I. F. amplifier network may embody one or more amplifier tubes selectively tuned to the operating I. F. value of 5 mc. Of course, all signal transmission circuits between the signal collector and the demodulator or detector will be so constructed as to pass efficiently a band at least 150 kc. wide. It is, also, usual to design the signal transmission circuits to have a pass band of approximately 200 kc. in width to provide for reasonable tolerances, such as oscillator drift and the like. The output transformer 1 feeding the final I. F. amplifier tube 2 has its primary and secondary circuits 3 and 4 each tuned to the operating I. F. value. The pass band of transformer 1 will preferably, as indicated above, be chosen to be of the order of 200 kc. wide, while the mean or center frequency of the band is 5 mc., in the example explained.

One of the reasons in the past for employing an amplitude limiter prior to the discriminator section (or FM translating network) of the demodulator to reduce undesired AM effects on the carrier wave, was to avoid the necessity for critical tuning to the exact center or carrier frequency of a desired FM wave.

In my present system no special amplitude limiter stage need be employed prior to the detector circuit, since the detector itself is substantially immune to amplitude variations of the received FM signals. Hence, the I. F. amplifier tube 2 possesses normal and full gain, which is the reverse of the usual operating condition for an amplitude limiter. The amplifier tube 2 may be of any suitable construction; its cathode 6 is connected to ground through a suitably bypassed cathode bias resistor 7. The ungrounded side of input circuit 4 is connected to control grid 8, and plate 9 of the tube is connected to the high potential side of resonant circuit 5. The plate 9 is connected to the +B terminal of a suitable source of direct current (not shown) through primary coil 10, while condenser 11 establishes the lower end of coil 10 at ground potential for I. F. currents.

The discriminator comprises coupled primary and secondary circuits denoted by numerals 5 and 12 respectively. While any known and suitable discriminator may be utilized to provide the energizing signal voltages for rectifiers 13 and 14, I prefer to explain the action on the basis of the discriminator circuit of Fig. 1. The discriminator network is generally of the type claimed and shown in my aforesaid patent, and is specifically disclosed in Fig. 1 of application Serial No. 529,074, filed April 1, 1944, by W. R. Koch now U. S. Patent 2,410,983. In general, it is desired to employ a network constructed and arranged to derive from angle modulated waves a pair of voltages whose relative amplitudes vary in accordance with the angular deviations of the waves with respect to a reference condition (whether phase or frequency).

Considering the specific illustrative embodiment of Fig. 1, coil 10 is shunted by condenser 15 to provide a parallel resonant circuit tuned to the operating I. F. The secondary coil 16 is coupled to primary coil 10, as indicated by numeral 17, and coil 16 is shunted by condensers 18 and 19 arranged in series. The resonant secondary circuit 12, including coil 16 and condensers 18, 19 is tuned to substantially the resonant frequency of the primary circuit 5. Each of coils 10 and 16 is preferably of the inductance trimmer type. Specifically, iron cores, plugs or slugs (symbolically represented at the lower ends of the coils 10, 16) are used for adjusting the inductance values of the coils 10 and 16. The high alternating potential side of coil 10 is connected by a lead to the junction of condensers 18 and 19 thereby establishing the junction point at the same alternating potential as the high potential side of primary circuit 5.

Concurrently, each of condensers 18 and 19 will function as a direct current blocking condenser to prevent application of +B voltage to the rectifiers 13 and 14. Moreover, condensers 18 and 19 offer a low impedance to the I. F. voltage at the primary circuit so that substantially the full value of primary voltage is applied to the rectifiers 13 and 14. Condensers 18 and 19 are approximately equal in value. Their combined series impedance in shunt with the wiring, tube and other stray, capacitative impedances resonates the coil 16 to the operating frequency. If desired, no magnetic coupling need be used between coils 10 and 16. For example, if the circuits are coupled by augmenting the diode capacity on one side, or the other, to produce a capacity unbalance, the primary coil 10 and secondary coil 16 will be capacitively coupled by an amount depending upon the magnitude of the unbalance of the two capacities.

Rectifiers 13 and 14 are shown by way of specific example as electron discharge devices of the diode type. It is to be clearly understood that the diodes may have their electrodes embodied in a common tube envelope, as in the 6H6 type tube. Applicant further recognizes that in the practice of his invention other forms of two-electrode rectifiers may be used in place of diode vacuum tubes, and his claims assume that other suitable forms of two-electrode rectifiers can correctly be said to have an anode and a cathode. The anode 20 of diode 13 is connected to the upper terminal, as diagrammatically shown, of condenser 18 and to the upper end of coil 16, whereas the cathode 21 of diode 14 is connected to the lower terminal of condenser 19 and to the lower end of coil 16. The cathode 22 of diode 13 and the anode 23 of diode 14 are directly connected by condenser 24. The anode 23 and the lower potential terminal of condenser 24 are established at ground potential for direct current. In accordance with my present invention, the magnitude of the condenser 24 is chosen so that the cathode 22 of diode 13 is also at ground potential with respect to modulation frequencies i. e., audio frequency, as well as for I. F.

The load resistor for diode 13 is designated by numeral 25, and it will be observed that the load resistor 25 is connected directly in shunt with the space current path of diode 13. Similarly, load resistor 26 is also connected directly between anode and cathode of its diode 14, and it is, therefore, directly in shunt with the space current path of that diode. There will be developed across each of resistors 25 and 26 respective voltages produced by rectification of signal currents.

Hence, it can be seen that the diodes 13 and 14 are arranged in reverse relation relative to the connection in a conventional FM detector circuit of the type employing balanced detector circuit diodes. This means that the direct current voltages across load resistors 25 and 26 are in additive polarity relation. Instead of providing zero direct current voltage when the applied carrier frequency is at balance, either a positive or negative voltage results depending upon which end of the series connection of the load resistors is grounded. The outer ends of the load resistors are bypassed, as by condenser 24, so that little or no modulation frequency voltage can exist between the cathode end of resistor 25 and ground. The resistors 25 and 26 are effectively in parallel to ground for audio frequency voltages, which are accordingly taken off from across the rectifiers, i. e., from one side of the rectifiers in relation to the other but are in series relation to ground with respect to direct current voltages.

The detector circuit is completed, in the embodiment shown in Fig. 1, by shunting condenser 24 with a resistor 27. The modulation voltage, in this case the desired audio frequency modulation signal voltage, is taken off by connecting an adjustable slider or tap 28 to the load resistor 26. In other words, the amplitude of the audio frequency voltage is determined by the position of slider 28 on resistor 26, and the maximum audio voltage which could be taken off from resistor 26 would occur when slider 28 is at the cathode end of resistor 26. The audio frequency voltage exists between the circuit connecting anode 20 and cathode 21, on the one hand, and the circuit connecting cathode 22 and anode 23, on the other. Each of these circuits is conductive to direct current, and the circuits in series with the rectifiers form a closed loop for flow of uni-directional currents. Resistors 25 and 26 are connected between such circuits and either of the resistors may serve conveniently for taking off a desired portion of the audio frequency voltage.

However, junction point 31 has high I. F. potentials, and slider 28 would detune both the primary circuit 5 and the secondary circuit 12 if it were allowed to be shifted to the cathode end of resistor 26. It will, therefore, be usual to make resistor 26 in two parts in series; one being a fixed resistor for the cathode end and the other being a potentiometer, or volume control, to complete the circuit back to the grounded element of diode 14, in this case anode 23. The intermediate dot 26' on resistor 26 illustrates such construction. If desired, a variable tap on the resistor 25 could be used for the audio take-off point.

Condenser 29 is an audio frequency coupling condenser, and is inserted in the connection between slider 28 and the input grid of the following audio frequency amplifier tube (not shown). Of course, one or more audio amplifier tubes may be employed, and the amplified audio frequency signals may be reproduced in any suitable manner, as by a loud speaker.

Before describing in detail the electrical relations existing in the detector circuit, there will be explained the manner in which the discriminator network of the detector functions, reference specifically being made to Figs. 2a and 2b. It is first assumed that FM signals applied to the primary circuit 5 are instantaneously at the mean or carrier frequency of 5 mc. This primary signal energies applied through condensers 18 and 19 of the two diodes will be of like polarity. However, anode 20 and cathode 21 are connected to opposite ends of coil 16. Due to the coupling between tuned circuits 5 and 12, there will be a 90 degree phase shift between the primary and the secondary circuit voltages when the instantaneous carrier frequency is at the resonant or center value.

Accordingly, the secondary signal voltage will be applied to anode 20 and cathode 21 from the respective ends of coil 16 in opposite polarity, but in each case in phase quadrature with the primary signal voltage which was applied through condensers 18 and 19. It follows, therefore, that the resultant signal voltages applied to anode 20 and cathode 21 will be equal at the carrier frequency, and the rectified voltages across respective resistors 25 and 26 will be of equal magnitude. In Fig. 2a, I have portrayed the vector relations which exist at the instantaneous carrier frequency between the primary voltage $E_p$ and each half of the total secondary voltage $E_s$. The resultant voltages applied to the two diodes are respectively designated by the dashed arrows indicated E' and E''.

If at some later instant the FM signals have a frequency different from the resonant frequency of circuit 12, there will occur a phase shift of the signal energy transmitted through the transformer 10, 16 which is greater or less than 90 degrees, depending on the direction and the extent of frequency difference between the instantaneous frequency of the FM signals and the predetermined resonant frequency of the tuned circuits 5 and 12. In Fig. 2b, I have shown the vector relations corresponding to such a frequency deviation. It will be seen that the total secondary voltage $E_s$ has undergone an angular shift relative to the primary voltage. The resultant voltage E' is now greater than the other resultant voltage E''. This means that there will be applied to the diodes 13 and 14 resultant signal voltages of different magnitudes, and, therefore, the rectified voltages across resistors 25 and 26 will be of different magnitudes. When I recite in the appended claims or any of them "a pair of signal voltages" and "means for applying each of said pair of voltages to a respective rectifier," or employ like language, the meaning is that one of the voltages is applied to one of the rectifiers and the other of the voltages is applied to the other rectifier.

The I. F. amplifier tube 2 and its output circuit 5 are parts of the receiver serving as a source of received waves to the discriminator section of my detector circuits. Wherever in the appended claims I have recited "a source of angle modulated carrier waves" or "a source of frequency modulation signal" or "a source of frequency modulated carrier waves" or the like, I refer to a part or parts of the receiver, e. g. tube 2 and circuit 5, supplying the angle modulated or frequency modulated waves to the discriminator. Likewise, in reciting "means for impressing modulated carrier frequency waves on said rectifiers" or the like, I refer to parts of the receiver preceding the rectifiers.

Assume, now, that resistor 27 is removed from the detector circuit. If it were assumed further that each of the resultant voltages represented by E' and E'' in the condition of Fig. 2a had a value of 5 volts, there would be about +5 volts (direct current voltages) across each of resistors 25 and 26. The point 30, the cathode end of resistor 25 would then be about +10 volts relative to ground, since the resistors are in series for direct currents. The condenser 24 would be charged to +10 volts. If, now, the instantaneous frequency of the applied signals deviates to produce the condition represented at Fig. 2b, there may be produced, for example, +7 volts across resistor 25 and +3 volts across resistor 26. The difference in resultants E' and E'' (assuming that E' is applied to anode 20) accounts for the different magnitudes of rectified voltages.

The sum of the rectified voltages will still be +10 volts, and the potential at point 30 and the charge on condenser 24 will remain at +10 volts. If the frequency of the FM signals at circuit 5 deviated to the opposite side of center frequency, resulting in the angular position for $E_s$ shown by the dashed line in Fig. 2b, then vector E'' would be longer than vector E'. Hence, the voltage across resistor 26 would be +7 volts in the assumed case, and that across resistor 25 would be +3 volts. The total voltage across resistors 25 and 26 would still equal +10 volts. If the applied signals varied cyclically, or in accordance with a desired FM program, between these frequency values, the junction of resistors 25 and 26 (point 31) would vary between +3 volts and +7 volts in accordance with the frequency variations of the signal. The tap 28 can be adjusted to take off any desired magnitude of modulation frequency voltage across resistor 26.

Consider, now, the action of resistor 27 which is normally low compared to resistors 25 and 26. It can be demonstrated that if resistors 25 and 26 are normally very high (½ to 1 megohm) or no resistors shunt the diodes as in Fig. 5, the two diodes in the circuit produce a damping action on the primary circuit which is the equivalent of that which would result if a resistor of approximately one-eighth the value of that used for resistor 27 were placed directly in shunt with the primary. However, the action on the secondary circuit is only equivalent to the placing of a resistor of about one-half the value of resistor 27 across the secondary. Therefore, the effect on the primary circuit of increasing or decreasing diode currents can be substantially greater than the action on the secondary circuit. For this reason the present explanation disregards any small damping action which the diodes may have on the secondary circuit. However, these effects can also be altered by the relative L/C ratios of the primary and secondary, and another type of operation, still within the scope of this invention, might utilize damping action equally on both circuits or principally on the secondary.

It is well known that any balanced discriminator is immune to amplitude variations when such variations occur at the center frequency, and this circuit is no exception to that rule. However, if the amplitude of the applied signal energy is suddenly changed while the carrier is at one side of center frequency (or if mistuning has shifted the steady state unmodulated carrier to one side) the balance condition does not hold, and amplitude variations in a normally balanced discriminator are reproduced as audio voltages.

In this present circuit a sudden increase in applied signal energy results in a sudden increase in the diode currents, but the applied diode voltages can increase only very slightly, since the bias on the two diodes 13 and 14 is rigidly maintained against audio fluctuations by the bypass condenser 24. Thus, a very minor increase in applied signal voltage causes a very large increase in diode current, which means an increased damping action on the primary circuit 5. However, even though the diode currents do increase markedly, they will increase in direct proportion to the lengths of E' and E''. Since the sum of the output voltages is held constant against audio fluctuations by the condenser 24, it develops that a sudden increase in applied signal produces practically no change in the audio potential at point 31. The condenser 24 in conjunction with resistor 27 thus acts as a voltage or potential source constant against amplitude variations at modulation frequencies by maintaining constant against such variations the potential produced by rectification of the angle modulated waves.

Conversely, if the applied signal should take a sudden drop when it is not on resonance, the two diode currents are very markedly decreased. The damping action of the diode currents on the primary circuit 5 is instantaneously lessened even for a very minute lessening of the diode voltages, and practically no change in the audio potential of point 31 results. The value of the resistor 27 determines the average diode current, and thus the average damping effect, and thereby determines how low the applied energy can drop before the self-regulating effect ceases to operate to maintain the audio potential of point 31 against the effect of an instantaneous decrease in the signal energy applied from the amplifier tube 2. Demodulators of frequency-modulated waves operating in accordance with this invention are known in the trade as "ratio detectors."

If resistor 27 is too small, the impedance of the entire discriminator is materially lessened and the gain of the amplifier tube 2 is small, and the discriminator output is thus low. However, if resistor 27 is too large, the restoring characteristic for sudden decreases in applied energy is insufficient. I have found that a good value for resistor 27 is that which causes a decrease in the direct current potential of point 30 to from one-third to one-tenth of the potential which exists when the resistor is removed, with the same I. F. potential applied to the grid of tube 2. This value will vary depending upon the normal "Q" and particular and of the secondary to a lesser extent. In practice, I have found that with an undamped primary tuned impedance of 100,000 ohms at the resonant frequency a value of 25,000 ohms for resistor 27 will operate in the manner described. The resistors 25 and 26 should be of the order of ½ to 1 megohm in this circuit.

Another advantage of the circuit shown in Fig. 1 is that the diode load resistors are effectively in parallel for audio frequency voltages, and, therefore, the difficulties due to differences in the time constants of the two load resistors and their associated capacities do not exist. For example, condensers 18 and 19, which are the secondary tuning condensers, form a time constant circuit with resistors 25 and 26 in parallel. The time constant can, if desired, be equal to 100 microseconds and thereby provide de-emphasis of the detected FM signal. In present standard FM broadcasting there occurs a pre-emphasis of the higher modulation frequencies during modulating of the FM carrier wave at the transmitter. Accordingly, it will be seen that the secondary tuning condensers and the load resistors may cooperate to perform an additional function, to wit: de-emphasis of the higher modulation frequencies.

I have heretofore stated that in one embodiment of my present invention the direct current voltage across the series-connected load resistors is established at a predetermined fixed value. This bias may be provided by either a battery, or by the bleeder of a direct current voltage source which may be a part of the direct current supply network of the receiver. In Fig. 3 I have shown a modification of the invention wherein the condenser 24 and its shunt resistor 27 are replaced by a source of substantially fixed voltage. It will be understood that the essential difference between the arrangement of Fig. 3 and that shown in Fig. 1 consists in the aforesaid replacement. The arrows through coils 10 and 16 indicate that the inductance value of these coils may be varied. In this modification the bleeder resistor 32 is connected between the cathode 22 of the diode 13 and the grounded anode 23 of diode 14. The resistors 32 and 33 are included in the usual voltage supply divider which is connected between the +B terminal and ground. This voltage divider 32, 33 is constructed so that there is developed across resistor 32 the desired direct current voltage which is to function as the substantially fixed voltage between point 30 and ground. There is, also, shown shunted across the secondary circuit 12 a resistor 35, which may be adjustable so as to alter its magnitude even increasing to infinity. The function of the resistor 35 is to provide damping, if necessary.

In explaining the functioning of the circuit shown in Fig. 3, let it be assumed that the voltage of point 30 is maintained continuously at a value of +5 volts. In that case in the absence of signal +2.5 volts will appear across resistor 25, and +2.5 volts will appear across resistor 26. It follows, therefore, that each of diodes 13 and 14 will have a delay bias applied thereto which will prevent rectification or detection of any kind, unless the signal energy at the grid 8 of the prior amplifier tube 2, has a sufficient magnitude so that either of the resultant vectors E' or E'' exceeds +2.5 volts. In other words, by using the substantially fixed bias source 32 the detector functions so as to demonstrate a threshold bias. The latter must be overcome by applied signals to provide an output voltage at tap 28. Obviously this characteristic may provide a measure of suppression of interstation noise impulses. Assuming a suitable voltage is fixed across the bleeder resistor 32 the noise impulses occurring between the predetermined FM station settings of the tuning device will be of insufficient magnitude to cause detection.

Upon the applied signals overcoming the delay bias on diodes 13 and 14, the D.-C. potentials across resistors 25 and 26 will continue to remain at a total of +5 volts. To this end the power supply current through resistor 32 is made many times that which may be derived from the incoming signal. In other words, voltage variations will occur across resistors 25 and 26 in the manner described in connection with Fig. 1, but the voltage source 32 imposes a substantially fixed value on the total voltage between point 30 and ground. It may be desirable so to proportion the current drawn from the +B supply to the average diode current that some increase in potential of point 30 results when a signal is being received. This would provide a combination of fixed and self-bias.

I do not wish to be limited to specific values of resistors, condensers, and other elements since those skilled in the art will have much latitude in the choice of such values. However, in a circuit according to Fig. 1 which was successfully operated by me the following elements had the values indicated:

Resistor 25=500,000 ohms
Resistor 26=500,000 ohms
Resistor 27=25,000 ohms
Condenser 24=4 microfarads Likewise, the circuit shown in Fig. 3 was successfully operated with elements having the following values:

Resistor 25=500,000 ohms
Resistor 26=500,000 ohms
Resistor 32=1,000 ohms
Resistor 33=50,000 ohms
Resistor 35=between 100,000 ohms and 250,000 ohms
Condenser 34=40 mfd.

The elements included in resonant circuits 5 and 12 may have values corresponding to those which have been used in previously known FM discriminator circuits. It may be found desirable to omit condenser 15 from primary circuit 5, and make the primary 10 of sufficiently high inductance to allow it to be brought into resonance with the normal shunt tube and circuit capacities, thus producing a very high tuned impedance.

In Fig. 4 I have shown how to employ the present FM detector circuit to provide automatic volume control (AVC) bias for the receiver. To secure the AVC bias both diode connections for diodes 13 and 14 are reversed from the connections shown in Fig. 1. That is to say, the anode 20 of diode 13 is connected to point 30, while the cathode of the diode is connected to the high potential side of secondary circuit 12. The anode 23 of diode 14 is connected to point 31, while the cathode of the diode is grounded. The condenser 24 connects point 30 to ground, as in Fig. 1, and resistor 27 shunts condenser 24. If desirable, a delay bias of —2 volts, for example, may be applied to an intermediate point 60 on resistor 27. The AVC connection 61, which may include a suitable filter network 62, is made from point 30 to the low potential sides of the respective signal grid input circuits of the various amplifiers whose gains are to be controlled. It has been pointed out in the discussion of Fig. 1 that the direct current voltages across resistors 25 and 26 are in additive polarity relation. Fig. 4 shows how the resulting direct current voltage may be made available for AVC. The time constant of the AVC circuit may be of a value conventionally used in standard broadcast, amplitude-modulated receivers. By using the AVC circuit relatively slow changes in received carrier amplitude are minimized. The relatively fast AM variations will be minimized in the manner explained previously in connection with Fig. 1.

In Fig. 5 I have shown a further modification of the invention so as to demonstrate its utility in connection with an FM detector circuit of the specific type disclosed in my aforesaid patent. The discriminator section of the circuit of Fig. 5 is substantially the same as disclosed in my patent, and need not be explained again. The primary and secondary circuits 5 and 12 are coupled as in the case of Fig. 1. The center tap on secondary coil 16 is connected to the high potential side of circuit 5 through a direct current blocking condenser 70. At the opposite ends of coil 16 there will be produced the resultant voltages E' and E''. Diodes 13 and 14 are arranged as shown in Fig. 1, but are not directly shunted by resistors. Instead, the cathode 22 is connected to the grounded anode 23 through the series-arranged load resistors 72 and 73.

The junction of these load resistors is connected by the radio frequency choke coil 74 to the center tap of coil 16. In other words, each of the load resistors is now arranged in series in the space current path of each diode. However, the load resistors 72 and 73 and the diodes 22 and 23 are still in series for direct currents, and are effectively connected in parallel for audio frequency currents by the condenser 75 which is shunted across both resistors 72, 73. The output connection can be a tap on resistor 73. In this case the total value of resistance 72 plus resistance 73 can be of the same value as the single resistance 27 of Fig. 1. The condenser 75 can have the same value as the condenser 24 of Fig. 1.

In Figs. 1 and 4 resistor 27 and condenser 24 constitute a long time-constant circuit connected with the diodes 13 and 14 through conducting leads of negligible impedance to flow of electric current. The same is true of the circuit 32, 34 of Fig. 3 and the circuit 72, 73, 75 of Fig. 5. The arrangements of Figs. 1, 4 and 5 also operate without anode potential other than that provided by the impressed signal waves. Moreover, as has been heretofore fully explained, the arrangements of Figs. 1, 4 and 5 provide a direct current voltage which changes automatically in accordance with the average strength of the received signals to the proper value required to receive frequency modulated waves with simultaneous rejection of undesired amplitude variations.

In Fig. 6 I have portrayed in a purely explanatory manner the difference between the actions of the circuits of Fig. 1 and Fig. 3 respectively. The detected output voltage of an FM signal wave is plotted against the FM signal input amplitude. The dashed line 80 is the curve of output versus input for the circuit connection shown in Fig. 1, while solid line 81 shows the respective relations for the circuit of Fig. 3.

Consider, first, a signal input strength represented by $a$ on the abscissa. The detected output voltage for the circuit of Fig. 1 would be represented by the point $a'$ on the ordinate, but the detected output from the circuit of Fig. 3 would be zero, since in the latter case amplitude $a$ is insufficient to override the fixed bias on diodes 13 and 14 in Fig. 3. Consider, next, an amplitude represented by $b$ on the abscissa. In this case the detected output in the circuit of Fig. 1 would be represented by $b'$ on the ordinate, and the detected output of the circuit of Fig. 3 would be $b''$. It can, therefore, be seen that the detected output of the circuit of Fig. 1 will be directly proportional to the FM signal input. However, because of the aforementioned action wherein condenser 24 inhibits rapid variations in the bias of diodes 13 and 14 and thereby obliterates rapid amplitude variations of the I. F. potentials applied to those diodes, rapid variation in the amplitude of the signal would cause the output potential of point 31 Fig. 1 to follow either of the dotted curves 83 or 83' depending upon the average strength of the applied signal. As previously explained, the size of resistor 27 in relation to the tuned impedance of circuit 5 and other elements of the circuit will determine the fraction of the average amplitude to which the signal must momentarily drop before it hits the knee of the curve as indicated at either 84 or 85.

The curve 81, as previously mentioned, is indicative of the action of the circuit of Fig. 3. In this case no output is realized unless the signal amplitude is greater than that indicated by $a$, and increasing output with input will be experienced until the signal is of sufficient amplitude to pass the knee of this curve at 86. From here on further increase in amplitude, either on a slow or fast basis, causes no change in detected output. This action occurs, because of the fact that point 30 is rigidly fixed at a given potential (in this case positive) with respect to ground, and this potential is divided equally as a bias on diodes 13 and 14 in a direction which inhibits conduction unless the applied I. F. vector sum potentials exceed these fixed direct current potentials as will be the case at point $a$. For stronger signals, such as those represented by $b$, the bias on point 30 is still rigidly maintained, and the aforementioned damping action is very greatly increased due to excessive diode currents. The net result is that the vector potentials applied to the diodes are no larger than would be the case had potentials just sufficient to cause those vectors to override the knee 86 of the curve 81 been applied at the grid 8 of amplifier 2.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In a detector for angle modulated waves, a pair of rectifiers arranged in a closed loop in like current-flowing sense, a respective load resistor operatively associated with each rectifier, means for combining the rectified direct current potentials across said resistors in series-aiding polarity, and means for maintaining the sum of the two rectified potentials across said resistors against modulation frequency variations.

2. In a balanced frequency modulation detector of the type employing a pair of two-electrode rectifiers, means for combining the rectified current potentials of the rectifiers in series-aiding polarity, and means for maintaining the sum of the rectified potentials against modulation frequency variations.

3. In combination with a source of angle modulated carrier waves, means for deriving from the waves a pair of signal voltages whose relative magnitudes are dependent upon the angular modulations of the waves, a pair of rectifiers including respective load resistors, means for applying each of said pair of voltages to a respective rectifier, means including a circuit having resistance and capacity in parallel with each other and having negligible impedance for modulation frequency currents for connecting said rectifiers in parallel for modulation frequency currents, means for connecting said rectifiers in series-aiding polarity for direct current potentials, and means for deriving modulation frequency voltage variations from across at least one of the rectifiers.

4. In combination, a source of frequency modulation signals, a discriminator therefor, a pair of diode rectifiers, means connecting the anode of one rectifier and cathode of the second to predetermined points of said discriminator, a condenser of low impedance to audio frequency currents connecting the cathode of said one rectifier to the anode of the second rectifier, and means for deriving modulation signal voltages from across at least one of the rectifiers.

5. In combination, a source of frequency modulation signals, a discriminator therefor, a pair of diode rectifiers, means connecting the anode of one rectifier and cathode of the second to predetermined points of said discriminator, a condenser of low impedance to audio frequency currents connecting the cathode of said one rectifier to the anode of the second rectifier, means for deriving modulation signal voltage, a load resistor shunting each respective diode, said deriving means being connected to one of the load resistors.

6. In a detector for frequency modulated waves, a pair of diode rectifiers arranged in a series-aiding closed loop, a respective load resistor shunted across each rectifier, means for combining the rectified direct current potentials across said resistors in series-aiding polarity, and a condenser for maintaining the sum of the two rectified potentials across said resistors against modulation frequency variations.

7. In a frequency modulation detector of the type employing a pair of two-electrode rectifiers, means for combining the rectified current potentials of the rectifiers in series-aiding polarity, and means for connecting the rectifier circuits in parallel for modulation frequency currents and for maintaining the sum of the rectified potentials against modulation frequency variations.

8. In combination with a source of frequency modulated carrier waves, discriminator means for deriving from the waves a pair of signal voltages whose relative amplitudes are dependent upon the frequency deviations of the waves, a pair of diode rectifiers including respective shunt load resistors, means for applying each of said pair of voltages to a respective diode rectifier, a condenser for connecting said diode rectifiers in parallel for modulation frequency currents, means for connecting said rectifiers in series-aiding polarity for direct current potentials, and adjustable means for deriving from one of the load resistors modulation frequency voltage variations.

9. In combination, a source of frequency modulation signals, a discriminator therefor, a pair of two-electrode rectifiers, means connecting the anode of one rectifier and cathode of the second to predetermined spaced points of said discriminator, a condenser of low impedance to audio frequency currents connecting the cathode of said one rectifier to the anode of the second rectifier, means for deriving from one rectifier modulation signal voltage, and means for deriving from the second rectifier a direct current voltage variable with signal amplitude.

10. In combination, a source of frequency modulation signals, a discriminator therefor, a pair of diode rectifiers, means connecting the anode of one rectifier and cathode of the second to predetermined points of said discriminator, a condenser of low impedance to audio frequency currents connecting the cathode of said one rectifier to the anode of the second rectifier, means for deriving from one rectifier modulation signal voltage, a separate load resistor shunting each respective diode, said deriving means including an adjustable tap connected to one of the load resistors.

11. In combination, a source of frequency modulation signals, a discriminator therefor, a pair of diode rectifiers, means connecting the anode of one rectifier and cathode of the second to predetermined points of said discriminator, a condenser of low impedance to audio frequency currents connecting the cathode of said one rectifier to the anode of the second rectifier, a resistor in shunt across said condenser, and means for deriving audio voltage from said rectifiers.

12. In combination, a source of frequency modulation signals, a discriminator therefor, a pair of diodes, means connecting the anode of one diode and cathode of the second diode to predetermined points of said discriminator, a condenser of low impedance to audio frequency currents connecting the cathode of said one diode to the anode of the second diode, a load resistor shunting each respective diode, and a resistor in shunt with said condenser.

13. In a system as defined in claim 12, capacitive means operatively associated with said load resistors to produce a time constant of such value as to decrease the higher modulation frequency component voltages.

14. In a detector for angle modulated waves of the type embodying a pair of two-electrode rectifiers and wave input network supplying a pair of signal potentials whose relative amplitudes are a function of the angle modulation of said waves; the method which includes applying said potentials to respective rectifiers, adding the respective rectified direct current potentials in series-aiding relation, and maintaining the total of the added potentials against modulation frequency variations.

15. In a detector for angle modulated waves of the type embodying a pair of rectifiers and wave input network supplying a pair of signal potentials whose relative amplitudes are a function of the angle modulation of said waves; the method which includes applying said potentials to respective rectifiers, adding the respective rectified direct current potentials in series-aiding relation, and maintaining the total of the added potentials against modulation frequency variations and variably damping said input network as a function of the instantaneous amplitude of the signal applied to said network.

16. In combination with an amplifier for angle modulated carrier waves comprising at least one vacuum tube, means for deriving from the waves a pair of signal voltages whose relative magnitudes are dependent upon the angular modulations of the waves, a pair of rectifiers, means for applying each of said pair of voltages to a respective rectifier, means for connecting said rectifiers in series-aiding polarity for direct current potentials, means for substantially maintaining the sum of the rectified potentials against modulation frequency variations, said means allowing the sum potential to vary at a rate slower than useful modulation frequency variations, and means for utilizing such sum voltage for automatic control of the gain of said vacuum tube amplifier.

17. In combination with a source of angle modulated carrier waves, means for deriving from the waves a pair of signal voltages whose relative magnitudes are dependent upon the angular modulations of the waves, a pair of rectifiers including load resistance, means for applying each of said pair of voltages to a respective rectifier, means for connecting said rectifiers in series-aiding polarity for direct current potentials, means for utilizing in parallel the modulation frequency components of the rectified outputs of said rectifiers, and capacitive means associated with the load resistance to produce a time constant to decrease the higher modulation frequency component voltages.

18. In combination with a source of frequency modulated carrier waves, an input circuit including means for deriving from the waves a pair of signal voltages whose relative magnitudes are dependent upon the frequency modulations of said waves, a pair of rectifiers each having at least an anode and a cathode, a circuit connecting the anode of one rectifier to the cathode of the other, another circuit connecting the cathode of the first-mentioned rectifier to the anode of the second-mentioned rectifier, said last-mentioned circuits in series with said rectifiers constituting a closed loop for flow of uni-directional currents and one of said last-mentioned circuits including at least a part of the input circuit, means for applying each of said pair of voltages to a respective rectifier, a resistor in one of said circuits, means for establishing across said resistor a direct current potential substantially fixed against amplitude variations at modulation frequencies variations, and means connected between said circuits for deriving modulation-frequency voltage variations therefrom.

19. In combination with a source of frequency modulated carrier waves, means for deriving from the waves a pair of signal voltages whose relative magnitudes are dependent upon the frequency modulations of said waves, a two-electrode rectifiers each having an anode and a cathode, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents, means for applying each of said pair of voltages to a respective rectifier, a resistor in one of said circuits, and means for establishing across said resistor a direct current potential substantially fixed against amplitude variations at modulation frequencies variations, the desired modulation frequency variations being developed on one of said circuits in relation to the other.

20. A detector comprising a pair of two-elements rectifiers each having an anode and a cathode, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents, means for applying modulated carrier waves to the respective rectifiers, means in one of said circuits for establishing a direct current potential substantially fixed against amplitude variations at modulation frequencies variations, and means for deriving modulation-frequency voltage variations from one of said circuits in relation to the other.

21. In combination with a source of angle modulated carrier waves, means for deriving from the waves a pair of signal voltages whose relative magnitudes are dependent upon the modulations of said waves, a two-electrode rectifiers each having an anode and a cathode, a circuit connecting the anode of one rectifier to the cathode of the other, a second circuit connecting the cathode of the first-mentioned rectifier to the anode of the second-mentioned rectifier said circuits in series with said rectifiers constituting a closed loop for flow of uni-directional currents, means for applying each of said pair of voltages to a respective rectifier, a resistor in one of said circuits, means for establishing across said resistor a direct current potential substantially fixed against amplitude variations at modulation frequencies variations, and means for deriving modulation-frequency voltage variations from one of said circuits in relation to the other.

22. In combination with an amplifier for frequency modulated carrier waves comprising at least one vacuum tube, means for deriving from the waves a pair of signal voltages whose relative magnitudes are dependent upon the frequency modulations of said waves, a pair of rectifiers each having at least an anode and a cathode, a circuit connecting the anode of one rectifier to the cathode of the other, a second circuit connecting the cathode of the first-mentioned rectifier to the anode of the second-mentioned rectifier said circuits in series with said rectifiers constituting a closed loop for flow of uni-directional currents, means for applying each of said pair of voltages to a respective rectifier, a resistor in one of said circuits, means for establishing across said resistor a direct current potential substantially fixed against modulation frequency variations, means for deriving modulation-frequency voltage variations from one of said circuits in relation to the other, and means for automatically controlling the gain of said amplifier by the potential obtained from said resistor, which varies with the average strength of the voltages applied to the rectifiers.

23. In a demodulator of angle-modulated waves, two rectifiers each having at least an anode and a cathode arranged in series for flow of direct current, means including a common input circuit also connected in series with the rectifiers for flow of direct current for impressing modulated carrier frequency waves on said rectifiers, means for establishing on one side of said rectifiers a direct current potential stabilized against voltage variations of modulating frequency, and connections across said rectifiers for deriving modulation frequency voltages from said demodulator.

24. A detector comprising a pair of rectifiers each having at least an anode and a cathode, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents, means for applying modulated carrier waves to the respective rectifiers, means in one of said circuits for establishing between terminals of the rectifiers and by anode-cathode currents produced by the modulated carrier waves a direct current potential substantially fixed against modulation frequency variations, and means for deriving modulation-frequency voltage variations from one of said circuits in relation to the other.

25. In a demodulator of angle-modulated waves, two rectifiers each having at least an anode and a cathode arranged in series for flow of direct current, means for impressing modulated carrier frequency waves on said rectifiers, means in the connections on one side of said rectifiers for establishing a direct current voltage varying in value in accordance with the average strength of the impressed modulated carrier waves and stabilized against voltage variations of modulating frequency, and connections across said rectifiers for deriving modulation frequency voltages from said demodulator.

26. In a demodulator of angle-modulated waves, two rectifiers each having at least an anode and a cathode arranged in series for flow of direct current, means for impressing modulated carrier frequency waves on said rectifiers, a resistance and capacity in parallel with each other connected between the rectifiers to establish by anode-cathode currents produced by the modulated carrier waves a direct current voltage stabilized against voltage variations of modulating frequency, low impedance connections between said resistor and said rectifiers and connections across said rectifiers for deriving modulation frequency voltages from said demodulator.

27. In combination with a source of frequency modulated carrier waves, a pair of rectifiers each having at least an anode and a cathode, a circuit connecting the anode of one rectifier to the cathode of the other, a second circuit connecting the cathode of the first-mentioned rectifier to the anode of the second-mentioned rectifier, one of said circuits including means for impressing on said rectifiers a pair of signal voltages whose relative magnitudes are dependent upon the frequency modulations of said waves and said circuits in series with said rectifiers constituting a closed loop for flow of uni-directional currents, a resistor in one of said circuits, a large condenser connected across said resistor for establishing a direct current potential substantially fixed against modulation frequency variations, connections of substantially zero impedance between said resistor and adjacent terminals of the rectifiers, and means for deriving modulation-frequency voltage variations from one of said circuits in relation to the other.

28. In combination with a source of angle-modulated carrier waves, means for deriving from the waves a pair of signal voltages whose relative magnitudes are dependent upon the modulations of the waves, said means including a primary circuit, a secondary circuit tuned to the carrier frequency and two couplings between the primary and secondary circuits, one of which transfers the angle-modulated waves to the secondary circuit without phase change and the other of which transfers angle-modulated waves to the secondary circuit with a voltage phase change dependent on the modulations of the waves, a pair of rectifiers each having at least an anode and a cathode, a direct current conducting circuit connecting the anode of one rectifier to the cathode of the other, a second direct current conducting circuit connecting the cathode of the first-mentioned rectifier to the anode of the second-mentioned rectifier, one of said direct current conducting circuits including said secondary circuit and connections for applying each of said pair of voltages to a respective rectifier and said direct current conducting circuits in series with said rectifiers constituting a closed loop for flow of uni-directional currents, resistance in one of said direct current conducting circuits, a large capacity in parallel with said resistance for establishing across it a direct current potential substantially fixed against audio frequency variations, and connections for deriving audio frequency voltages from across said rectifiers.

29. In a demodulator of angle-modulated waves, two rectifiers each having at least an anode and a cathode arranged in series for flow of direct current, means for impressing modulated carrier frequency waves on said rectifiers, a resistance of the order of 25,000 ohms and a capacity of the order of 4 microfarads connected in parallel with each other between the rectifiers to establish a direct current voltage depending in value on the average strength of the impressed carrier waves and stabilized against voltage variations of modulation frequency, low impedance connections between said resistance and said rectifiers, and connections across said rectifiers for deriving modulation frequency voltages from said demodulator.

30. A method of detecting angle modulated waves which comprises developing from the waves a pair of voltages of wave frequency whose relative amplitudes are a function of the instantaneous frequency, deriving in response to said pair of voltages a pair of respective unidirectional voltages, maintaining the sum of the unidirectional voltages substantially constant against modulation frequency variations but in proportion to the average strength of the received waves, substantially maintaining the ratio of said unidirectional voltages in direct proportion to said relative amplitudes, and comparing the unidirectional voltages to provide an indication of the ratio of said relative amplitudes.

31. In a detector for angle modulated carrier waves, a discriminator for deriving from the waves a pair of signal voltages whose relative amplitudes are dependent upon the modulations of said waves, a pair of two-electrode rectifiers, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of undirectional currents, connections in one of said circuits for applying one of said pair of voltages to one of the rectifiers and the other of said pair of voltages to the other rectifier, a resistance in the other of said circuits, a capacity for maintaining the potential produced by rectification of received angle modulated waves substantially fixed against modulation frequency variations, and connections for deriving modulation-frequency voltage variations existing between the two said circuits.

32. In combination with an amplifier for angle modulated waves, a discriminator for deriving from the waves a pair of signal voltages whose relative amplitudes are dependent upon the angular modulations of the waves, a pair of rectifiers, connections for applying one of said voltages to one of said rectifiers and the other of said voltages to the other rectifier, circuits connecting said rectifiers in series-aiding polarity for direct current, a potential source constant against amplitude variations at modulation frequencies, said potential source allowing the sum of the rectified potentials to vary at a rate slower than useful modulation frequency variations, and connections for utilizing such sum potential for automatic control of the gain of said amplifier.

33. In combination with an amplifier for angle modulated waves, a discriminator for deriving from the waves a pair of signal voltages whose relative amplitudes are dependent upon the angular modulations of the waves, a pair of two-electrode rectifiers, connections for applying one of said voltages to one of said rectifiers and the other of said voltages to the other rectifier, circuits connecting said rectifiers in series-aiding polarity for direct current, a potential source constant against amplitude variations at modulation frequencies, said potential source allowing the sum of the rectified potentials to vary at a rate slower than useful modulation frequency variations, connections for deriving modulation frequency voltages from the rectifiers, and connections for utilizing such sum potential for automatic control of the gain of said amplifier.

34. In combination, a discriminator for angle modulated waves, said discriminator including a secondary circuit for deriving from the waves a pair of voltages whose relative amplitudes are dependent upon the angular modulations of the waves, a pair of two-electrode rectifiers, two circuits connecting said rectifiers in series for direct currents, one of said circuits including said discriminator secondary circuit and the other of said circuits including a potential source constant against amplitude variations at modulation frequencies but responsive to the average amplitude of the waves applied to the input circuit of the discriminator, and an output circuit for deriving modulation signal voltages from said two rectifier-connecting circuits.

STUART W. SEELEY.

REFERENCES CITED

The following references are of record in the file of this patent:

UNITED STATES PATENTS

| Number | Name | Date |
|---|---|---|
| 2,173,231 | Koch | Sept. 19, 1939 |
| 2,190,319 | Koch | Feb. 13, 1940 |
| 2,282,101 | Tunick | May 5, 1942 |
| 2,286,378 | Roberts | June 16, 1942 |
| 2,296,092 | Crosby | Sept. 15, 1942 |
| 2,302,834 | Bliss | Nov. 24, 1942 |
| 2,413,913 | Duke | Jan. 7, 1947 |

FOREIGN PATENTS

| Number | Country | Date |
|---|---|---|
| 552,807 | Great Britain | Apr. 27, 1943 |